US009273247B2

(12) United States Patent
Bauer et al.

(10) Patent No.: US 9,273,247 B2
(45) Date of Patent: Mar. 1, 2016

(54) SUBSTITUTED AMINO ALCOHOLS AS CHIRAL DOPANTS

(71) Applicant: Fraunhofer-Gesellschaft zur Förderung der Angewandten Forschung E.V., München (DE)

(72) Inventors: Monika Bauer, Königs-Wusterhausen (DE); Lutz Hartmann, Teltow (DE); Frank Kuschel, Halle/S (DE); Wolfgang Weissflog, Halle (DE)

(73) Assignee: Fraunhofer-Gesellschaft Zur Förderung Der Angewandten Forschung E.V., Munich (DE)

( * ) Notice: Subject to any disclaimer, the term of this patent is extended or adjusted under 35 U.S.C. 154(b) by 0 days.

(21) Appl. No.: 14/346,361

(22) PCT Filed: Oct. 10, 2012

(86) PCT No.: PCT/EP2012/070053
§ 371 (c)(1),
(2) Date: Mar. 21, 2014

(87) PCT Pub. No.: WO2013/053752
PCT Pub. Date: Apr. 18, 2013

(65) Prior Publication Data
US 2014/0228591 A1    Aug. 14, 2014

(30) Foreign Application Priority Data

Oct. 13, 2011    (DE) .......................... 10 2011 054 473
Feb. 9, 2012    (DE) .......................... 10 2012 201 962

(51) Int. Cl.
*C07C 229/00*    (2006.01)
*C09K 19/54*    (2006.01)
*C09K 19/58*    (2006.01)

(52) U.S. Cl.
CPC .............. *C09K 19/54* (2013.01); *C09K 19/586* (2013.01)

(58) Field of Classification Search
CPC ..... C09K 19/54; C09K 19/586; C07C 229/00
USPC ......... 560/1, 37, 56, 61; 428/1.1; 252/299.01, 252/299.6, 299.63, 299.67
See application file for complete search history.

(56) References Cited

U.S. PATENT DOCUMENTS

| 6,695,977 B2 | 2/2004 | Prechtl et al. |
| 2006/0266978 A1 | 11/2006 | Walba et al. |

FOREIGN PATENT DOCUMENTS

| DE | 19611101 A1 | 9/1997 |
| DE | 19625441 A1 | 1/1998 |
| DE | 10351364 A1 | 6/2005 |
| EP | 1213293 A1 | 6/2002 |
| EP | 2065371 A1 | 6/2009 |
| WO | 02094805 A1 | 11/2002 |
| WO | 2009068284 A2 | 6/2009 |

OTHER PUBLICATIONS

Booth, C.J., "Handbook of Liquid Crystals," vol. 2A, Chapter IV: Chiral Nematic Liquid Crystals, 1. The Synthesis of Chiral Nematic Liquid Crystals, pp. 303-334 (Mar. 10, 1998).
Friedel, G. "The Mesomorphic States of Matter," Annals of Physics (Paris), 18, p. 273 (1922).
Stegemeyer, H. et al., "Optical Rotatory Power of Liquid Crystal Mixtures," Chemical Physics Letters, vol. 6, No. 1, pp. 5-6 (Jul. 1, 1970).
Sage, Ian, "Thermochromic Liquid Crystals in Devices," vol. 3, Chap. 20, pp. 301-343 (1992).
Jakeman, E., et al., "Electro-Optic Response Times in Liquid Crystals," Physics Letters, vol. 39A, No. 1, pp. 69-70 (Apr. 10, 1972).
Greubel, W., "Bistability Behavior of Texture in Cholesteric Liquid Crystals in an Electric Field," Applied Physics Letters, vol. 25, No. 1, pp. 5-7 (Jul. 1, 1974).
Clark, Noel A., et al., "Submicrosecond Bistable Electro-optic Switching in Liquid Crystals," Applied Physics Letters, vol. 36, No. 11, pp. 899-901 (Jun. 1, 1980).

(Continued)

*Primary Examiner* — Geraldina Visconti
(74) *Attorney, Agent, or Firm* — Wood, Herron & Evans, LLP

(57) ABSTRACT

The invention relates to the use of a substituted, chiral amino alcohol, comprising one or more structural units of the following formula (1), wherein the abbreviations A, Y, R1 and R3 to R5 have the following meanings: is a covalent bond or a hydrocarbon group, Y is a covalent bond or a hydrocarbon group that can have an oxygen atom at one of its ends through which it is bonded to $R_1$, $R_1$ is an aliphatic or heterocyclic or aromatic radical, the carbon chain of which may be interrupted by one or more B groups, $R_5$ is selected from the group consisting of (a) aliphatic radicals, wherein individual carbon atoms may be replaced by oxygen atoms or carbonyl groups, and wherein the carbon chains of same radicals may be optionally interrupted by a B group, and (b) araliphatic, cycloaliphatic, aromatic and heterocyclic radicals, wherein the carbon chain can be interrupted by one or more B structural elements and/or by one or more D coupling groups, $R_3$, $R_4$ are hydrogen or aliphatic or araliphatic substituents, which are independent of one another, wherein the carbon chain can be interrupted by one or more B groups, B is selected from polymerizable or crosslinkable structural elements from the group comprising $C_1$-$C_{16}$-alkenyl, $C_1$-$C_{16}$-alkenyloxy, —C≡C—, —CH═CH—COO—, —CH═CH—, —CX═CH—COO— with X═$C_1$-$C_{16}$-alkyl, and the trans-form of —OOC—CH═CH—COO—, and D is selected from —O—, —NH—, —N(CH$_3$)—, —N(C$_2$H$_5$)—, —SO$_2$—, —CO—, —COO—, —CH═CH—, —OCOO—, —OCH$_2$—, CH═N, —CF$_2$CF$_2$—, as a chiral dopant in liquid crystal (mixtures), e.g., in electro-optical systems.

21 Claims, 1 Drawing Sheet

(56) References Cited

OTHER PUBLICATIONS

Makow, David M., "Peak Reflectance and Color Gamut of Superimposed Left- and Right-Handed Cholesteric Liquid Crystals," Applied Optics, vol. 19, No. 8, pp. 1274-1277 (Apr. 15, 1980).
Wu, Chun-Ming, et al., "Novel Cholesteric LCs with Dual-Chirality Toward High Reflectivity," International Display Workshops '08, Niigata, Japan, pp. 455-458 (Dec. 2008).
Braun, Manfred, et al., "Bis-Chelated Imine-Alkoxytitanium Complexes: Novel Chiral Dopants with High Helical Twisting Power in Liquid Crystals," Chemistry: a European Journal, vol. 11, Issue 11, pp. 3405-3412 (May 20, 2005).
Ferrarini, Alberta, et al., "Chiral Amplification in a Cyanobiphenyl Nematic Liquid Crystal Doped with Helicene-like Derivatives," Beilstein Journal of Organic Chemistry, vol. 5, No. 50 (Oct. 7, 2009).
Rego, James A., et al., "Asymmetric Synthesis of a Highly Soluble 'Trimeric' Analogue of the Chiral Nematic Liquid Crystal Twist Agent Merck S1011," Liquid Crystals, vol. 37, Issue 1, pp. 37-43 (Jan. 2010).
Seebach, Dieter, et al., "TADDOLe, lhre Derivate und Analoga—Vielseitige Chirale Hilfsstoffe," Angewandte Chemie, vol. 113, Issue 1, pp. 97-142 (Jan. 5, 2001).
Bauer, Monika, et al., "Evaluation of Chiral Dopants for LCD Applications," Journal of the Society for Information Display, vol. 14, Issue 9, pp. 805-812 (Sep. 2006).
Dornow, Alfred, et al., "Neuere Ergebnisse bei Hydrierungen von a-Ketonitrilen und Isonitrosoketonen mit Lithiumaluminiumhydrid," Chem Berichte, vol. 88, Issue 8, pp. 1267-1275 (Aug. 1955).
Miller, Von Emerson, R., "Ueber das Ephedrin," Archiv der Pharmazie 240, pp. 481-498 (1902).
Eberhard, August, Dr., "Ueber die Synthese des Inaktiven Ephedrins bez. Pseudoephedrins," Archive der Pharmazie 258, pp. 97-129 (1920).
Bretschneider, H., et al., "Über die Beziehungen Zwischen Seitenkettenhydroxyl und Kern bzw. Methylaminogruppe in Phenylalkanol-methylaminen," Monatshefte Fur Chemie Chemical Monthly, vol. 81, Issue 1-2, pp. 31-52 (1950).
Lee, Daesung, et al., A Strategy for Macrocyclic Ring Closure and Functionalization Aimed Toward Split-Pool Syntheses, Journal of American Chemical Society, 121, pp. 10648-10649 (1999).
Gerber, Paul R., "On the Determination of the Cholesteric Screw Sense by the Grandjean-Cano-Method," Z. Naturforsch, 35a, pp. 619-622 (1980).
Eric C. Hansen et al: "Ring Closing Enyne Metathesis: Control over Mode Selectivity and Stereoselectivity", Journal of the American Chemical Society, vol. 126, No. 46, Nov. 1, 2004, pp. 15074-15080, XP055053263.
James H. P. Utley et al: "Electro-organic reactions. Part 42. The diastereoselective cathodic hydrodimerisation of cinnamate esters; preparative aspects", Journal of the Chemical Society, Perkin Transaction 1, No. 16, Jan. 1, 1995, p. 1961, XP05503273.
A. Ladenburg et al, "Über das Pseudo-Ephedrin", Berichte der deutschen chemischen Gesellschaft, Jan. 1, 1889, pp. 1823-1827, XP055053270 (German language; no English translation).
Bialecka-Florjanczyk E: "New optically active dopants for liquid crystal mixtures-(s)-1-phenylethylamine derivatives", Molecular Crystals and Liquid Crystals (Inc. Nonlinear Optics), Gordon and Beach Science Publishers, Reading, GB, Vo. 82, No. 7, Jan. 1, 1982, pp. 243-246, XP002094797.
International Preliminary Report on Patentability issued by the International Bureau of WIPO in corresponding International Application No. PCT/EP2012/070053, Apr. 15, 2014 (9 pages) (English translation only).

SUBSTITUTED AMINO ALCOHOLS AS CHIRAL DOPANTS

The present invention relates to substituted chiral amino alcohols with one, preferably two and optionally more chiral centers and the use thereof as dopants in liquid crystals, for example for electro-optical systems.

Of the various liquid crystal material states, those that have a helical superstructure (chiral liquid crystal phases) are of particular practical interest. These include the cholesteric (chiral nematic) and the chiral smectic (e.g., ferroelectric) phases. The particular interest results from the remarkable optical properties of these chiral systems: cholesteric phases have high optical rotation and pronounced circular dichroism, which arises through the selective reflection of circular polarized light in a cholesteric layer. Numerous individual crystalline-liquid compounds are known which form such cholesteric states in certain temperature intervals, e.g., cholesteryl benzoate or (S)-4-(2-methylbutyl)-4'-cyanobiphenyl (see C. J. Booth in *Handbook of Liquid Crystals*, vol. 2A, 303 f., Wiley-VCH, 1998). However, cholesteric systems can also be induced from achiral phases, e.g., nematic phases, by addition of chiral dopants, which themselves need not necessarily be crystalline-liquid. These methods, which have long been known (G. Friedel: *Ann. Phys.* (Paris) 18, 273 (1922), H. Stegemeyer, K. J. Mainusch: *Chem. Phys. Lett.* 6, 5 (1970)) offer a great range of material variations, which are necessary for practical applications.

The optical properties of cholesteric layers, especially the optical rotation and the wavelength of the selectively reflected light, depends substantially on the pitch of the helical superstructure, which in induced mixtures can primarily be regulated through the concentration of the chiral dopant added. At a given concentration, these properties are generally also temperature-dependent, which can be practically utilized in thermochromicity, for example in the form of LC-thermography films, see I. Sage in *Liquid Crystals Applications and Uses*, vol. 3, 301 f., World Scientific, 1992.

Display technology uses have great practical significance; they are based on the fact that the helical superstructures in cholesteric layers can be reversibly modified or eliminated by electrical fields. Thus the possibility exists of electrically modulating the transmission or reflection of light by such functional layers, see E. Jakeman et al., *Phys. Lett*, 39A, 69 (1972). With thin, oriented, ferroelectric layers of chiral smectic liquid crystals, the absorption of linearly polarized light can be modulated by switching the polarity of an electrical field, so that an electro-optical display system can be achieved with the aid of polarizing filters.

In particular it is possible to produce cholesteric functional layers by virtue of the fact that different optical states can be established depending on the strength or frequency of the electrical field, which said states are retained even after the electrical power is turned off (bistable or multi-stable displays, see W. Greubel, *Appl. Phys. Lett.* 25 5 (1974), N. A. Clark et al., *Appl. Phys. Lett.* 36, 899 (1980)).

Dopants with which such functional layers are produced by chiral induction must have a high twisting capability (helical twisting power, HTP) relative to the achiral host mixtures, be readily soluble in them, have high photostability when used in displays, be characterized by long-lasting inhibition of crystallization at low temperatures, not absorb in the visible wavelength range and not manifest any undesirable adsorption during display manufacturing.

It is also desirable for dopants for induction to have both right-handed and left-handed helical structures in the functional layers. In this process it is advantageous if substances of the same chemical composition but different configuration (enantiomers) can be used, since these are mirror-images of one another but otherwise have properties that are essentially identical. It is known that the optical contrast of bistable cholesteric displays can be increased if the display, instead of the functional layer, has two such layers with opposite handedness of the helical structures (double layer display), see M. Makow, *Appl. Optics* 19(8), 1274 (1980). In this display design the availability of enantiomers or diastereomers is particularly desirable, since otherwise mixtures of chemically different components which each have different voltage and temperature dependences on the selective reflection must be used, see D.-M. Wu et al., *Proc. IDW* 455 (2008). This can be associated with an undesirable limitation of the functioning area of such double-layer displays.

An additional aspect in the selection of chiral dopants relates to their simple and cost-advantageous synthesis. Multilayer syntheses with expensive starting materials and reagents (see Eur. Pat 1213293 (2002), M. Braun et al., *Chem. Eur. J.* 3405 (2005); A. Ferrarini et al., *Beilstein J. Org. Chem.* 5, (50) (2009); J. A. Rego et al., *Liq. Cryst.* 37, (1) 37 (2010)) which lead to the target products in a few, clear and configuration-retaining steps, starting from optically active natural materials or materials of the chemical industry that can be produced by enantioselective methods, are preferable.

Aside from the cholesterol derivatives that have been used for a long time and that are not very suitable for industrial applications because of their oxidation sensitivity and relatively low helical twisting power, essentially three groups are feasible in terms of their chiral basic structure in the manufacturing of auxiliaries with a broad application spectrum: derivatives of tartaric acid and the compounds derived from amino acids and from binaphthols, see D. Seebach et al., *Angew. Chem.* 113, 96 (2001) as well as DE 19611101 and WO02/094805). Starting from these basic structures, numerous dopants have been produced, although they come under consideration for display applications in only a few individual instances because of inadequate solubility or insufficient photo-stability (M. Bauer et al., *J. Soc. Inform. Display* 14, 805 (2006)). In addition, hexitol esters derived from hydrogenated hexoses, e.g., dianhydrosorbitol or dianhydromannitol (DE 19625441, DE 10351364) have been suggested as dopants. However, the use of these for double layer displays is opposed by the fact that the corresponding configurational isomers are frequently not available in this group of substances.

Through the acylation of L-ephedrine with benzoylcyanide, O,N-dibenzoyl-L-ephedrine can be obtained, see A. Dornow and H. Theidel: New results in hydrogenation of α-ketonitriles and isonitrosoketones with lithium aluminum hydride (Reductions with LiAlH$_4$, Part IX) in *Chem. Berichte*, 1955 (8), 1267-1275. O,N-diacetylephedrine is also known. In addition, WO 2009/068284 A2 discloses a number of picolinic acid amide derivatives in which the amino component is an amino alcohol that can be esterified with picolinic acid. These molecules have two chiral centers.

Dopants with particularly high HTP values are often characterized by voluminous, bulky molecular structures, which reduce their solubility in LC host phases. For example, when the TADDOL α, α, α', α'-tetraphenanthryl-1,3-dioxolane-4,5 dimethanol with an HTP value of about 290 μm$^{-1}$ and a melting point of 245-250° C. is used, crystallization of the dopant in the display occurs after some time.

Furthermore in several reports the manufacturing and twisting power of mononuclear and polynuclear chiral metal complexes have been described, see for example EP 1213293 A1. In particular, M. Braun et al. in *Chem. Eur. J.* 11, 3405

(2005) report on titanium complexes, the arylimine ligands of which were produced from regioisomeric 2-amino-1,1,2-triphenylethanols. These complexes sometimes demonstrate extremely high HTP values. However, their melting points are generally above 180° C. Furthermore, enantiomerically pure aminotriphenylethanols are either not commercially available at all or are only available at a high price (approx. 200 €/g).

The goal of the invention is to supply chiral dopants which can introduce a high degree of twisting in liquid crystals, especially for electro-optical systems, but do not have the above-described drawbacks of the previous dopants from this group. The chiral basic structure of these compounds should contain one or several asymmetric carbon atoms.

Surprisingly the goal was able to be accomplished by the preparation of chiral amino alcohols, occurring as enantiomers, with one or more structural units (1) in which both (at least) one amino group and (at least) one hydroxy group are substituted. These can be used as chiral dopants, alone or in a mixture with one or more additional amino alcohols with a structural unit of formula (1) and/or in a mixture with one or more other, for example, already known, dopants in a liquid crystal or a liquid crystal mixture. Therefore the invention relates to both the use of the above-defined amino alcohols for this purpose and liquid crystals and liquid crystal mixtures which contain one or more of these amino alcohols. In addition it relates to the amino alcohols mentioned insofar as these are novel.

The structural units (1) of the compounds suitable for the purpose of the invention can be represented by the following formula (1)

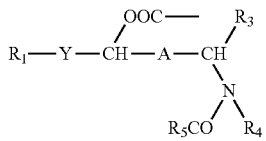

in which the abbreviations A, Y and $R_1$ and $R_3$ to $R^5$ have the following meanings:

A is a covalent bond or a saturated or unsaturated, straight-chain, branched or ring-containing hydrocarbon group with preferably 1-16 C atoms, preferably an aliphatic group, Y is a covalent bond or a saturated or unsaturated, straight-chain, branched or ring-containing hydrocarbon group with preferably 1-16 C atoms, preferably an aliphatic group, which can have an oxygen atom on one of its ends, over which it is connected to $R_1$, $R_1$ is a saturated or unsaturated, straight-chain or branched or ring-containing aliphatic group or a heterocyclic or an aromatic group, which in all cases may be substituted or unsubstituted and/or the carbon chain of which can be interrupted by one or more groups B, $R_5$ is selected from the group consisting of
  (a) saturated and unsaturated, straight-chain and branched, substituted and unsubstituted aliphatic radicals with preferably 1-16 C atoms, wherein individual C atoms may be replaced or substituted by oxygen atoms or carbonyl groups, wherein the carbon chains of these radicals may optionally be interrupted by a group B, and
  (b) araliphatic, cycloaliphatic, aromatic and heterocyclic, unsubstituted or substituted radicals, the carbon chains of which may be interrupted by one or more groups (structural elements) B and/or by one or more (coupling) groups D or the carbon atoms of which may be substituted with one or more groups B and/or one or more groups D, $R_3$, $R_4$ each independently represent hydrogen or an unsubstituted or substituted, straight-chain or branched or ring-containing aliphatic or an unsubstituted or substituted araliphatic radical, the carbon chain of which may be interrupted by one or more groups B, B is selected from among polymerizable or cross-linkable structural elements of the group composed of $C_1$-$C_{16}$-alkenyl, $C_1$-$C_{16}$-alkenyloxy, —C≡C—, —CH═CH—COO—, —CX═CH—COO— with ═$C_1$-$C_{16}$-alkyl and the trans-form of —OOC—CH═CH—COO—.

D is selected from generally divalent radicals O, NH, N(CH$_3$), N(C$_2$H$_5$), SO$_2$, C(O), C(O)O, CH═CH, OC(O)O, OCH$_2$, CH═N, CF$_2$CF$_2$.

Insofar as radicals are defined as aliphatic radicals, they are preferably alkyl radicals. The alkyl radicals mentioned in the invention in turn preferably contain 1-16 carbon atoms.

In a specific embodiment of the invention the amino alcohol with the structural element(s) (1) has the formula (2)

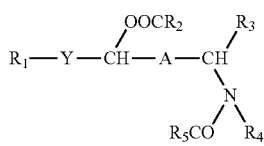

wherein the abbreviations A, Y, $R_1$ and $R_3$ to $R_5$ have the meanings as defined above and $R_2$ is a monovalent or a divalent or polyvalent group, selected from the group consisting of
  (a) saturated and unsaturated, straight-chain and branched, substituted and unsubstituted aliphatic hydrocarbon groups with preferably 1-16 C atoms, wherein individual C atoms can be replaced or substituted by oxygen atoms or carbonyl groups, wherein the carbon chains of these radicals can optionally be interrupted by a group B, and
  (b) araliphatic, cycloaliphatic, aromatic and heterocyclic, unsubstituted or substituted radicals, the carbon chains of which can be interrupted by one or more groups (structural elements) B and/or by one or more (coupling) groups D,
  (c) a single bond
  wherein for the case in which $R_2$ is a divalent or polyvalent radical, this radical bears a second structural element or more than two structural elements of formula (1).

The basic structure of the compounds with the structural elements (1) has two different reactive groups, namely a hydroxy group and an amino group, which are acylated in the structural elements of formula (1) and the compounds of formula (2) respectively. These hydroxy and amino groups have different reactivities. This has the advantage that for example acylations on the nitrogen atom proceed preferentially compared to those on the OH function. Thus dopants with dissimilar substituents $R_1$ and $R_2$ are also readily accessible by sequential acylation, which is substantially more difficult to achieve for dopants based on tartaric acid or a binaphthol structure.

An additional advantage of the compounds with the structural elements of formula (1) consists of their low crystallization tendency, which for example can be shown from the vitreous consistency of the compounds produced in examples 2 to 10.

The radicals $R_2$ and $R_5$ independently from one another may bear substituents. If this involves radicals of definition (a) above, halogen atoms such as fluorine, chlorine or bromine are preferred as substituents. If this involves radicals of the definition according to (b) above, the araliphatic, cycloaliphatic, aromatic or heterocyclic radicals with one or more substituents, selected for example from fluorine, chlorine, bromine, cyanide, cyanomethyl, cyanoethyl, cyanoethenyl, dicyanoethenyl, bis(alkyloxycarbonyl)ethenyl, hydroxy, formyl, nitro and saturated or unsaturated, straight-chain or branched aliphatic groups with preferably 1-16 C atoms can be substituted. In the last-mentioned aliphatic groups in turn, C atoms can be replaced by oxygen atoms or carbonyl groups or substituted with halogen atoms. The aliphatic groups can independently be connected directly or over a coupling group, for example by means of —O—, —NH—, —NHCH$_3$—, —SO$_2$—, —CO—, —COO—, —OOC—, —CH=CH—, —C≡C—, —OCOO—, CH=N, to the alicyclic and aromatic structural elements.

Each radical $R_2$, $R_5$ can have one, but optionally also several (each independently of the other radical $R_2$, $R_5$) araliphatic, cycloaliphatic, aromatic or heterocyclic structural elements. These can be connected to one another directly or through a coupling group, for example by means of one of the groups D mentioned.

If one or both radicals $R_3$, $R_4$ is/are an aliphatic radical, it may be a benzyl or phenethyl radical, which may optionally be substituted with polar and nonpolar radicals, for example methyl, ethyl, methoxy, ethoxy, fluoro, chloro, nitro or cyano.

If it is substituted, the radical $R_1$ bears one or more radicals preferably selected from alkoxy with preferably 1-16 C atoms, hydroxy, hydroxymethyl, hydroxyethyl, fluoro, chloro, cyano and nitro. If it is a heterocyclic or aromatic radical, this may also be substituted with one or more alkyl groups, which in turn preferably have 1-16 C atoms.

In a preferred embodiment the compounds according to the invention have the formula (3)

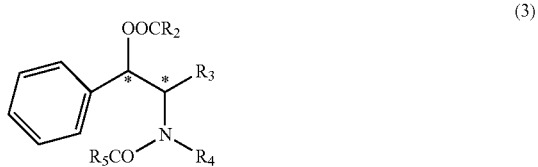

(3)

in which $R_2$ and $R_5$ indicate the same or different cycloaliphatic, aromatic, heterocyclic or other substituents containing one or more of these structural elements, and which optionally are furnished with one or more radicals selected for example from among $C_1$-$C_{16}$-alkyl groups, preferably $C_1$-$C_{12}$-alkyl groups, and in which $R_3$ and $R_4$ are the same or different substituents, which indicate hydrogen or branched or unbranched alkyl or alkyloxy groups or benzyl radicals.

In preferred embodiments of both compounds of formula (2) and of formula (3), the radicals $R_2$ and $R_5$ of the acylation groups are selected from among the following radicals or contain several of these radicals:

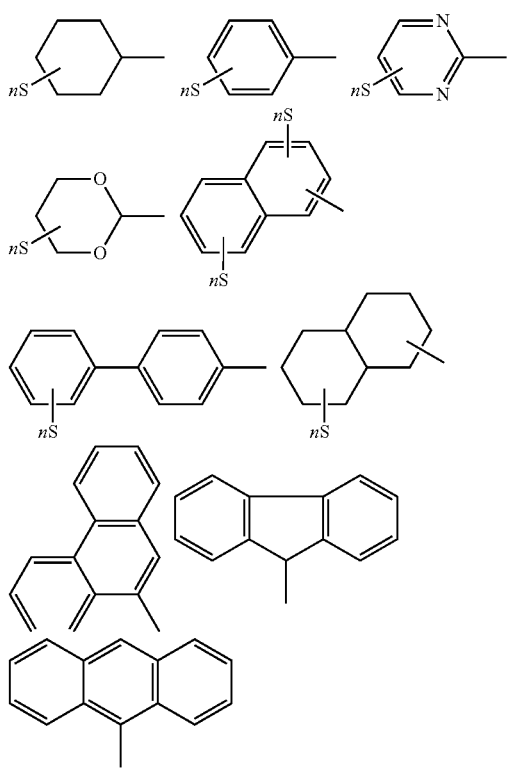

wherein n is 0 or 1 or an integer up to the number corresponding to the maximum number of possible substituents on the respective skeleton, and the substituents S are preferably selected from among fluorine, chlorine, bromine, cyano, cyanomethyl, cyanoethyl, cyanoethenyl, dicyanoethenyl, bis(alkyloxycarbonyl)ethenyl, hydroxy, formyl, nitro and saturated or unsaturated, straight-chain or branched aliphatic groups with preferably 1-16 C atoms. In turn, in the last-mentioned aliphatic groups, C atoms may be replaced by oxygen atoms or carbonyl groups or substituted with halogen atoms.

The chiral substances of the present invention as constituents (dopants) of liquid crystalline functional layers can induce helical (cholesteric or smectic) structures. These layers, with which both the intensity and the color of transmitted or reflected light can be electrically controlled, as mentioned form the essential components of liquid crystal displays. In addition to a high helical twisting power (HTP) they have good solubility in the liquid crystal base mixtures and high phase stability of the doped mixtures even at low temperatures.

In particular it is preferred to use enantiomerically pure ephedrine and pseudoephedrine as relatively inexpensive chiral amino alcohols. Particularly advantageous chiral-based structures are enantiomerically pure sympathomimetics, including the ephedrine-pseudoephedrine diastereomers. The latter and compounds derived from them have achieved particular significance as bases for enantiomer separation. In addition the (1R,2S)-ephedrines are of pharmacologic interest. In particular, ephedrine dibenzoate (E. R. Miller, *Archiv der Pharmazie* 240, 481 (1902); A. Eberhard, *Archiv der Pharmazie* 258, 118 (1920)) and the diacetates of (−)-ephedrine and (+)-pseudoephedrine (H. Bretschneider et al., *Monatsh. Chem.* 81, 31 (1950)) have long been known. Furthermore the acylation of 1,2-amino alcohols with unsaturated alkylmono- and alkylene dicarboxylic acids has been reported (D. Lee et al., J. Am. Chem. Soc. 121, 10648 (1999)). Reports on induction of chiral liquid crystal phases by such compounds have not become known to date.

Specific, preferred embodiments of the invention are given in the subclaims; a number of chiral amino alcohols first disclosed in this invention are claimed in an auxiliary claim and the subclaims thereof.

The invention will be illustrated by the examples that follow, but without being limited to them.

Here, the following general working techniques will be used:

The courses and products of the reactions will be examined by thin-layer chromatography with Polygram Sil G/UV thin-layer plates (Macherey-Nagel) under UV light and after development with a $KMnO_4$ solution.

Silica gel 60M, 0.04-0.63 mm (Macherey-Nagel) will be used for separation by column chromatography at normal pressure.

Melting points will be determined microscopically on a hot stage microscope; these are uncorrected.

1H- and 13C-NMR spectra will be measured with a Varian 300 MHz device; TMS will be used as an internal standard.

Qualitative testing of the chiral induction capacity will be performed with microscopic contact preparations using the nematic base mixture MLC-6650 (Merck KGaA). If the induction effect of the reaction product is sufficient, clearly visible polar borders will become apparent in the contact zones.

The determination of the HTP values will be performed by the Grandjean-Cano method using uniaxially ground plano-convex cylindrical lenses and flat quartz plates. The direction of movement of the interference bands generated by the oriented lens preparation upon rotation of the analyzer on the polarization microscope shows the direction of rotation of the induced helices (see P. R. Gerber, Z. Naturforsch. 35a, 619 (1980)). The measurements will be performed with approximately 1% solutions of the dopants in the nematic host mixtures MLC-6650, ZLI-00-1795 and E7 (Merck KGaA) as well as ZOC-1020XX (Chisso Co.). The HTP values relate to 1% by weight of the dopants in the liquid crystal solution.

EXEMPLIFIED EMBODIMENTS

Figure 1:
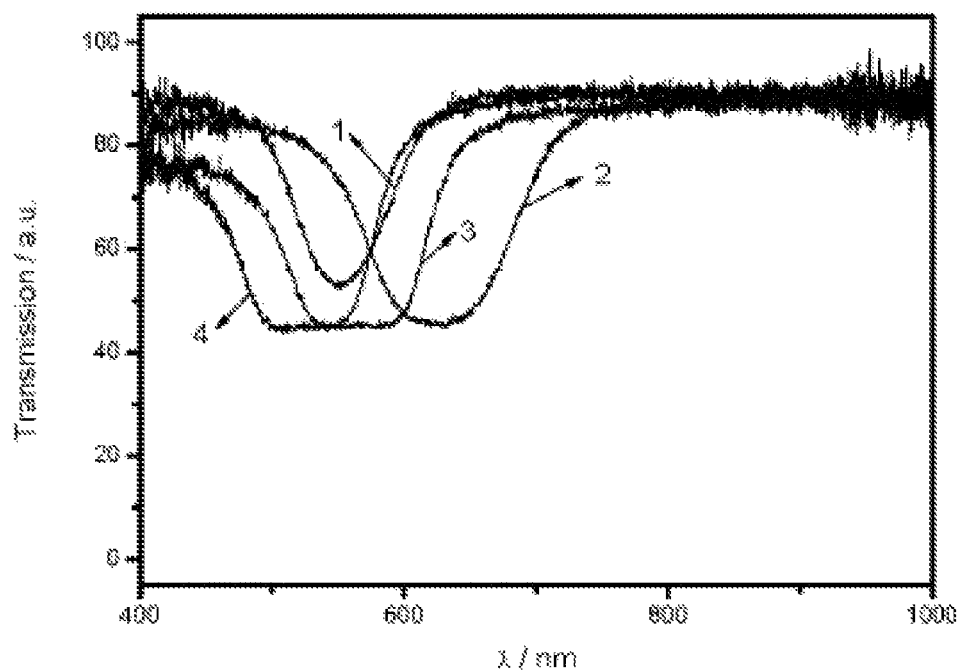
FIG. 1 shows the wave length dependence in the visible spectral range obtained by transmission measurements on thin-layer preparations of mixtures 1 to 4 of example 11 between glass slides.

Transmission measurements on cholesteric thin-layer preparations prepared between glass slides were conducted with an Ocean Optics USB2000+XR1-ES spectrometer. A controllable hot stage was also used for investigating the temperature dependence of the transmission minima.

EXAMPLE 1

(1R,2S)-2-(N-(4-trans-n-Pentylcylohexylcarbonyl)-methylamino)-1-(4-trans-n-pentylcyclohexylcarbonyloxy)-1-phenyl propane (compound I).

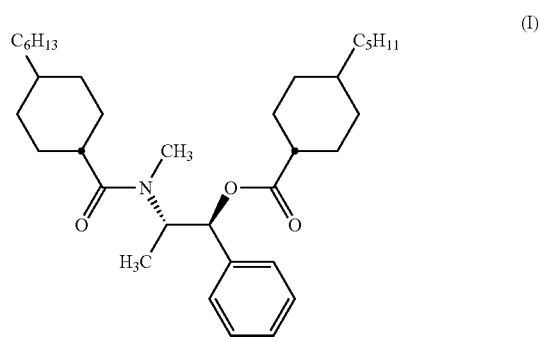

The 4-trans-n-pentylcyclohexylcarboxylic acid chloride used for this purpose is obtained from 7.2 g (36 mmol) of the corresponding acid by reaction with 9.4 g (74 mmol) oxalyl chloride in toluene solution after distilling off excess oxalyl chloride. A solution of 3 g (19 mmol) (1R,2S)-(−)-2-methylamino-1-phenyl-1-propanol ((1R,2S)-(−)-ephedrine) and 12 ml triethylamine in toluene is dropped into the residue at about 5° C. Then agitation is performed for 4 hours at room temperature and 12 hours at 85° C., and the reaction material worked up as follows: after addition of 10 ml of water, the solution is acidified with 10 ml of dilute HCl and the organic layer removed, washed several times with water, dried over $MgSO_4$ and freed from the solvent. 3.3 g (35% yield) of the reaction product are obtained after recrystallizing twice with methanol; melting point 85-87° C. The products obtained, after addition to nematic liquid crystals, induces cholesteric phases that reflect selectively in the visible light range.

EXAMPLE 2

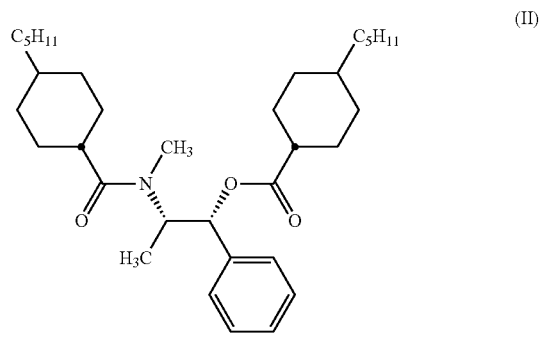

(1S,2S)-2-(N-(4-trans-n-Pentylcyclohexylcarbonyl)-methylamino)-1-(4-trans-n-pentylcyclohexylcarbonyloxy)-1-phenyl-propane (compound II) is produced in analogy to Example I from 4-trans-n-pentylcyclohexanecarboxylic acid and (1S,2S)-(+)-2-methylamino-1-phenyl-1-propanol ((1S, 2S)-(+)-pseudoephedrine). The crude product is purified by column chromatography (eluent solution toluene/ethyl acetate 5:1) and then by reprecipitation with methanol. A vitreously solidifying product is obtained in 29% yield.

EXAMPLE 3

(1R,2S)-(−)-2-(N-(6-n-hexyloxynaphthyl-2-carbonyl)-methylamino)-1-(6-n-hexyloxynaphthyl-2-carbonyloxy)-1-phenyl-propane (compound III)

is produced in analogy to Example 1 from 6-n-hexyloxy-2-naphthoic acid and (1R,2S)-2-methylamino-1-phenyl-1-propanol((1R,2S)-(−)-ephedrine). The syrupy red-brown crude product is purified using silica (elution solution toluene/ethyl acetate 5:1), resulting in a vitreously solidifying end product. The yield is 20%.

EXAMPLE 4

If the procedure of Example 3 is followed using instead of the ephedrine (1S,2S)-(+)-2-methylamino-1-phenyl-1-propanol ((1S,2S)-(+)-pseudoephedrine, a honey-yellow crude product is produced, the purification of which gives a vitreously solidifying end product (compound IV) in a yield of 20%.

EXAMPLE 4a

A diastereomer is produced according to Example 1 from 6-n-hexyloxy-2-naphthoic acid chloride and (1R,2R)-(−) pseudoephedrine. After doping with nematic mixtures, the product induces cholesteric phases with selective reflection in visible light.

EXAMPLE 5

(1R,2R)-(−)-Pseudoephedrine is acylated according to Example 1 with 4'-cyano-(1,1'-biphenyl)-4-carboxylic acid chloride. After column chromatographic purification (successive elution with toluene/ethyl acetate 5:1 and toluene/ethyl acetate 1:1) by column chromatography the product is obtained as (1R,2R)-(−)-2-(N-(4'-cyano-1,1'=biphenyl-4-carbonyl)-methylamino)-1-(4'-cyano-1,1'-biphenyl-4-carbonyloxy)-1-phenyl-propane (compound V)

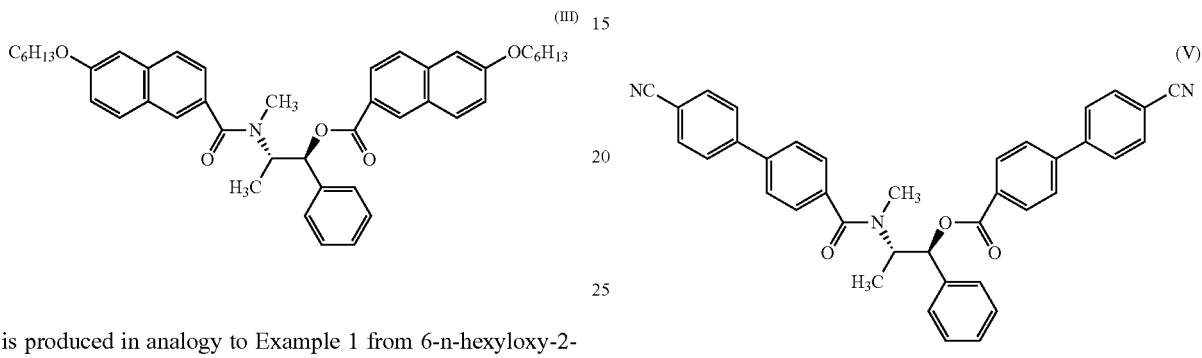

as a light-yellow, vitreous product with a yield of 22%.

EXAMPLE 6

In analogy to Example 1, (1R,2R)-(−)-pseudoephedrine is reacted with the acid chloride produced from 2,5-bis(4-n-propyloxyphenylcarbonyloxy) benzoic acid. After column chromatographic separation of the crude product by elution with toluene/ethyl acetate (5:1), compound VI (yield 26%) is obtained as a vitreously solidifying target product.

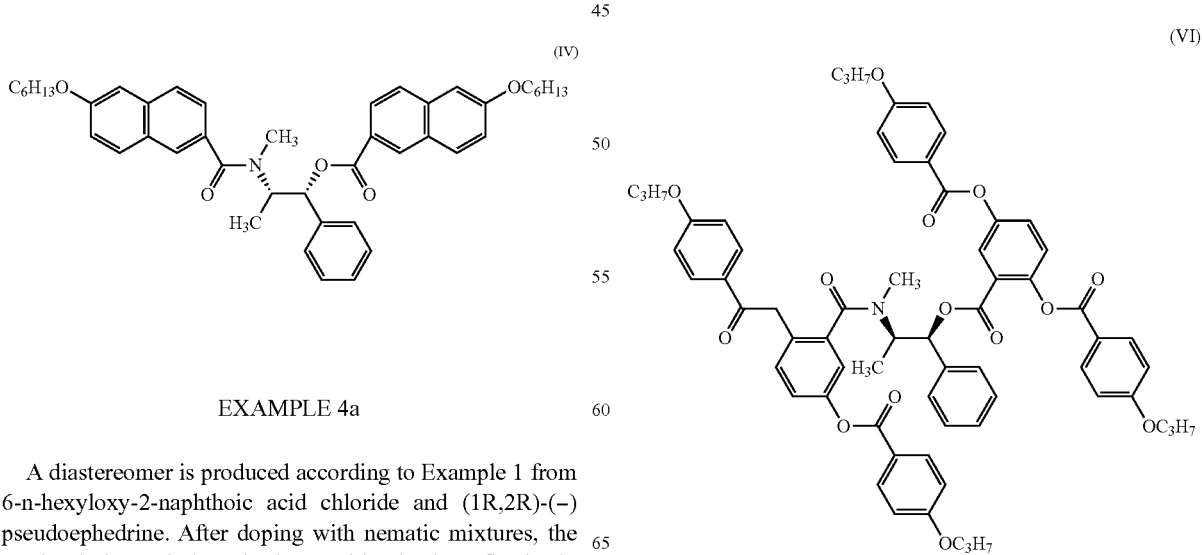

EXAMPLE 7

A. To synthesize a dopant with non-identical substituents $R_1$ and $R_2$, first 25 mmol each of (1R,2R)-(-)-pseudoephedrine and 4-trans-n-pentylcyclohexancarboxylic acid chloride are reacted in analogy with Example 1. After the usual workup of the reaction material, (1R,2R)-2-(N-(4-trans-n-pentylcyclohexylcarbonyl)-methylamino)-1-phenyl-1-propanol is obtained as a colorless, honey-like crude product that gradually crystallizes at room temperature. After recrystallization with n-hexane a white, crystalline product is obtained in a yield of 85%, melting point 89-92° C.

B. The pseudoephedrine monoacetylated according to A. is reacted in benzene solution in the presence of triethylamine with 4'-cyano-1,1-'-biphenyl-4-carboxylic acid chloridefor ormal 16 hours under agitation at 80° C. The column chromatographic workup of the crude product (elution with toluene/ethyl acetate 8:1), after removal of the solvent, gives the vitreous target product (1R,2R)-2-(N-(4-trans-n-pentyl-cyclohexylcarbonyl)methylamino)-1-(4'-cyano-1,1'-biphenyl-4-carbonyloxy)-1-phenyl-propane (compound VII) in a yield of 60% (based on pseudoephedrine).

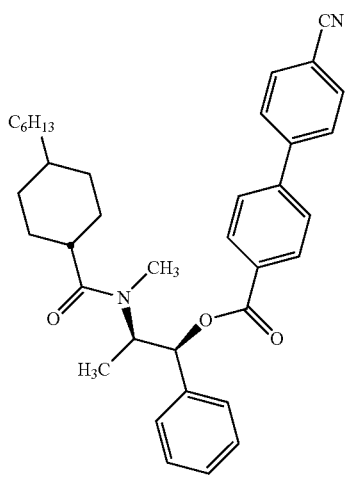

EXAMPLE 8

(1R,2R)-2-(N-(4-trans-n-Pentyl-cyclohexylcarbonyl) methylamino)-1-(6-n-hexyloxynaphthyl-2-carbonyloxy)-1-phenyl-propane (compound VIII)

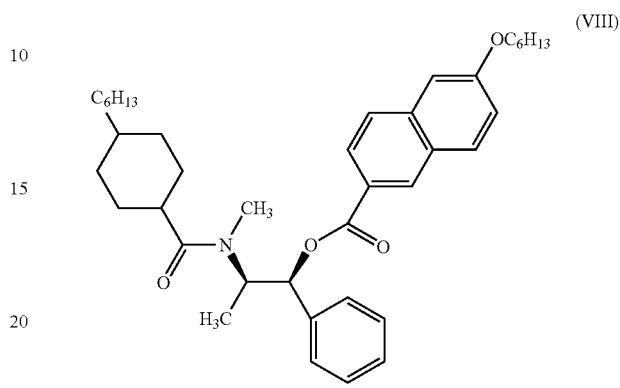

The (1R,2R-2-(n-(4-trans-n-pentylcyclohexylcarbonyl)-methylamino)-1-phenyl-1-propanol produced in accordance with Example 7A is esterified in benzene solution in the presence of triethylamine with 6-n-hexyloxy-2-naphthoic acid chloride, initially at room temperature and then at 70° C. for 24 hours. The workup of the reaction material described in Example 1 yields a syrupy crude product, after the column chromatographic purification of which (elution with toluene/glacial acetic acid 5:1) the vitreous target product is obtained in 65% yield (based on pseudoephedrine), which does not crystallize even after prolonged storage.

EXAMPLE 9

4,4'-Hexandiyldioxy-di-benzoic acid-di-((1R,2R)-2-(N-(4-trans-n-pentylcyclohexylcarbonyl)-methylamino)-1-phenyl-1-propyl ester (compound IX)

The monosubstituted amino alcohol produced according to Example 7A is reacted with half its equivalent amount of 4,4'-hexylenedioxydibenzoyl chloride in toluene solution and reacted in the presence of triethylamine under agitation for 4 days at 90° C. The yellow, honey-like crude product after column chromatographic purification (silica gel, elution with toluene/ethyl acetate 2:1) gives the glassy compound IX in a yield of 35%.

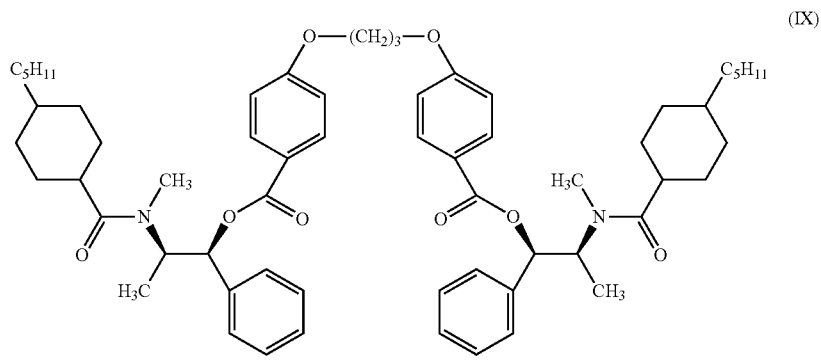

EXAMPLE 10

Naphthalene dicarboxylic acid-(2,6)-di-((1R,2R)-2-(N-(4-trans-n-pentyl-cyclohexyl-carbonyl)-methylamino)--phenyl-1-propyl ester) compound X)

The monoacylated amino alcohol produced according to Example 7A is dissolved in toluene and reacted in the presence of triethylamine with naphthalene-2-6-dicarboxylic acid chloride for 40 hours under agitation at 80° C. The column chromatographic purification of the crude product produced after the usual workup (silica gel, elution with toluene/ethyl acetate 3:1) gives the vitreously solidified end product with a yield of 30%.

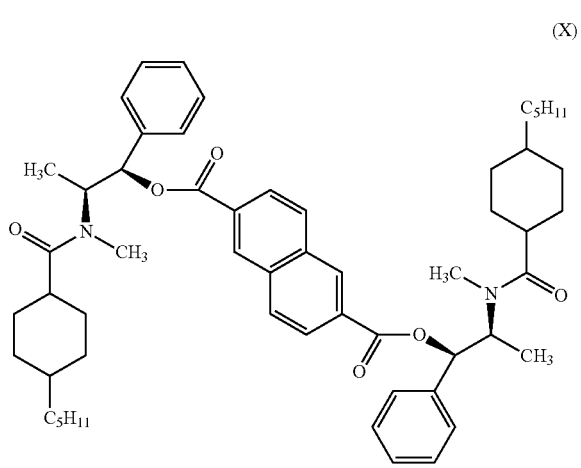

(X)

The HTP values of the compounds produced in Example 1 to 10 are listed in Table 1 below.

TABLE 1

| Compound | Host mixture | HTP/μm−1 | Rotation |
|---|---|---|---|
| I | MLC-6500 | 10 | left |
| II | MLC-6500 | 22 | right |
| III | MLC-6500 | 10 | left |
| IV | MLC-6500 | 17 | right |
| V | MLC-6500 | 15 | right |
| VI | MLC-6500 | 8 | right |
| VII | MLC-6500 | 44 | left |
| VII | ZOC-1020XX | 31 | left |
| VII | E7 | 40 | left |
| VII | MDA-00-1795 | 40 | left |
| VIII | MLC-6500 | 25 | left |
| IX | MLC-6500 | 20 | left |
| X | MLC-6500 | 27 | left |

EXAMPLE 11

Using compound VII the cholesteric mixtures listed in Table 2 were produced. Transmission measurements on thin-layer preparations made from between glass slides give the following wave length dependents in the visible spectral range shown in FIG. 1.

TABLE 2

| Mixture | Host | Dopant | Dopant content (% by wt) |
|---|---|---|---|
| 1 | MLC-6500 | VII | 5.8 |
| 2 | E7 | VII | 5.8 |
| 3 | MDA-00-1795 | VII | 6.1 |
| 4 | ZOC-1020XX | VII | 7.6 |

Figure 2:
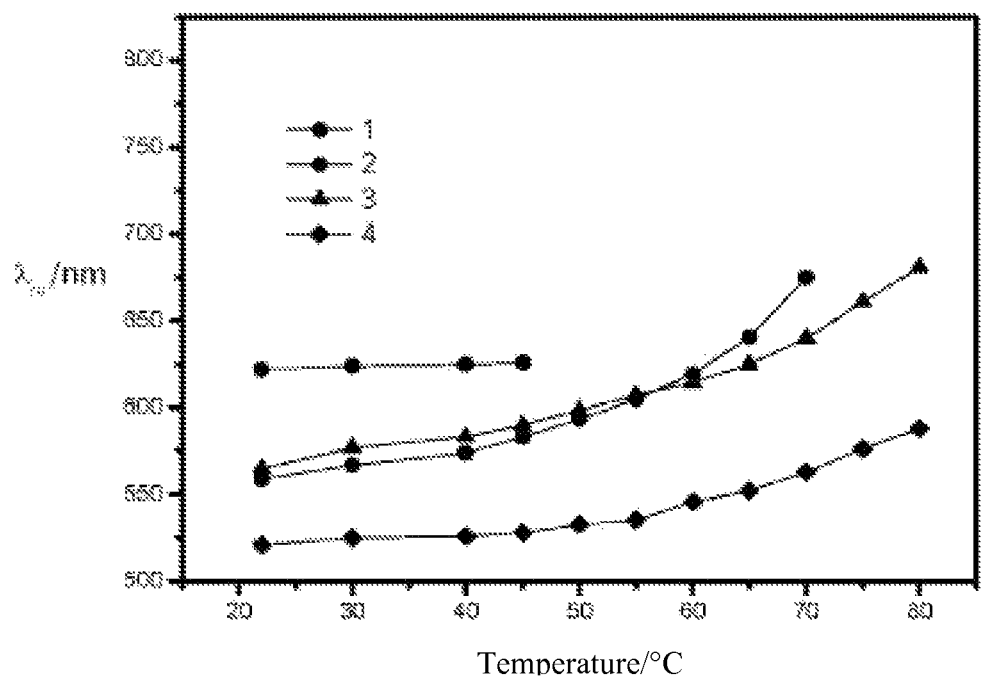
FIG. 2 shows the temperature dependence of the transmission minima measured on the thin layer preparations of mixtures 1 to 4 of example 11 between glass slides and that at 22° C, the wavelengths of the transmission minima increase according to the following sequence of mixtures: 4, 1, 3, and 2.

With the thin-layer preparations produced, the temperature dependence of the transmission minima (see FIG. 1) was also measured. The results are shown in FIG. 2.

Samples of the cholesteric mixtures used in Example 8 were stored for 120 hours at room temperature, at 0° C. and at −20° C. to test the phase stability. No separations or irreversible color changes were observed after this time period.

The invention claimed is:
1. A liquid crystal or liquid crystal mixture, comprising one or more chiral dopants, selected under substituted, chiral amino alcohols comprising one or more structural units of the following formula (1)

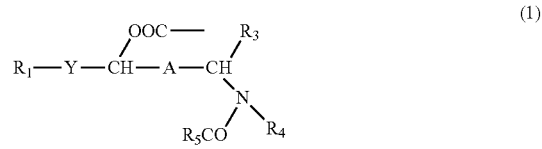

(1)

in which the abbreviations A, Y and $R_1$ and $R_3$ to $R_5$ have the following meanings:
  A is a covalent bond or a saturated or unsaturated, straight-chain, branched or ring-containing hydrocarbon group,
  Y is a covalent bond or a saturated or unsaturated, straight-chain, branched or ring-containing hydrocarbon group, which may have an oxygen atom on one of its ends, through which it is connected to $R_1$,
  $R_1$ is a saturated or unsaturated, straight-chain or branched or ring-containing aliphatic group or a heterocyclic or aromatic group, which in all cases may be substituted or unsubstituted and/or the carbon chain of which can be interrupted by one or more groups B,
  $R_5$ is selected from the group consisting of
    (a) saturated and unsaturated, straight-chain and branched, substituted and unsubstituted aliphatic radicals, wherein individual C atoms may be replaced or substituted by oxygen atoms or carbonyl groups, wherein the carbon chains of these radicals may optionally be interrupted by a group B, and
    (b) araliphatic, cycloaliphatic, aromatic and heterocyclic, unsubstituted or substituted radicals, the carbon chains of which may be interrupted by one or more groups B and/or by one or more groups D,
  $R_3$, $R_4$ each independently represents hydrogen or an unsubstituted or substituted, straight-chain or branched or ring-containing aliphatic or an unsubstituted or substituted araliphatic substituent, the carbon chain of which may be interrupted by one or more groups B,
  B is selected from among polymerizable or cross-linkable structural elements of the group composed of $C_1$-$C_{16}$-alkenyl, $C_1$-$C_{16}$-alkenyloxy, —C≡C—, —CH=CH—COO—, —CH=CH—, —CX=CH—COO— with X=$C_1$-$C_{16}$-alkyl and the trans-form of —OOC—CH=CH—COO—, D is selected from —O—, —NH—, —N(CH$_3$)—, —N(C$_2$H$_5$)—, —SO$_2$—, —CO—, —COO—, —CH=CH—, —OCOO—, —OCH$_2$—, CH=N, —CF$_2$CF$_2$—.

2. A liquid crystal or liquid crystal mixture according to claim 1, wherein the amino alcohol has the formula (2)

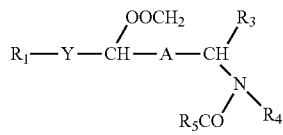

(2)

wherein the abbreviations A, Y, R$_1$ and R$_3$ to R$_5$ have the meanings as defined in claim 1 and R$_2$ is a monovalent or a divalent or polyvalent radical, selected from the group consisting of
(a) saturated and unsaturated, straight-chain and branched, substituted and unsubstituted aliphatic hydrocarbon radicals, wherein individual C atoms can be replaced or substituted by oxygen atoms or carbonyl groups, wherein the carbon chains of these radicals can optionally be interrupted by a group B as defined in formula (1) of claim 1, and
(b) araliphatic, cycloaliphatic, aromatic and heterocyclic, unsubstituted or substituted radicals, the carbon chains of which can be interrupted by one or more groups B and/or by one or more groups D as defined in formula (1) of claim 1,
(c) a single bond
wherein for the case in which R$_2$ is a divalent or polyvalent radical, this radical bears a second structural element or more than two structural elements of formula (1).

3. A liquid crystal or liquid crystal mixture according to claim 1, wherein the hydrocarbon group(s) A and/or Y is/are an aliphatic group.

4. A liquid crystal or liquid crystal mixture to claim 1, wherein the substituents of the radicals R$_2$ and R$_5$ are selected as follows:
if this involves aliphatic radicals according to definition (a): from among fluorine, chlorine and bromine; if this involves araliphatic, cycloaliphatic, aromatic or heterocyclic radicals according to (b): from among fluorine, chlorine, bromine, cyanide, cyanomethyl, cyanoethyl, cyanoethenyl, dicyanoethenyl, bis(alkyloxycarbonyl)ethenyl, hydroxy, formyl, nitro and saturated or unsaturated, straight-chain or branched aliphatic radicals, wherein in the last-mentioned aliphatic radicals, C atoms can be replaced by oxygen atoms or carbonyl groups or substituted with halogen atoms and/or these aliphatic radicals are connected directly or over a coupling group E to the aliphatic, cycloaliphatic, aromatic and heterocyclic structural elements.

5. A liquid crystal or liquid crystal mixture according to claim 1, in which one or both of the radicals R$_2$, R$_5$ have one or more araliphatic, cycloaliphatic, aromatic and/or heterocyclic structural element(s), wherein if several such structural elements are present, these are connected with one another directly or over a coupling group D as defined for claim 1.

6. A liquid crystal or liquid crystal mixture according to claim 1, wherein one or both of the radicals R$_3$, R$_4$ is an araliphatic radical each of which optionally being substituted with polar and nonpolar radicals, selected from among methyl, ethyl, methoxy, ethoxy, fluoro, chloro, nitro or cyano.

7. A liquid crystal or liquid crystal mixture according to claim 1, wherein the substituents of the radical R$_1$ are selected from among alkyloxy, hydroxy, hydroxymethyl, hydroxyethyl, fluoro, chloro, cyano and nitro.

8. A liquid crystal or liquid crystal mixture according to claim 1, wherein R$_1$ is a heterocyclic or an aromatic radical, which may be substituted with one or several alkyl groups.

9. A liquid crystal or liquid crystal mixture according to claim 1, wherein R$_2$ and R$_5$ are selected from among the following radicals or contain several of these radicals:

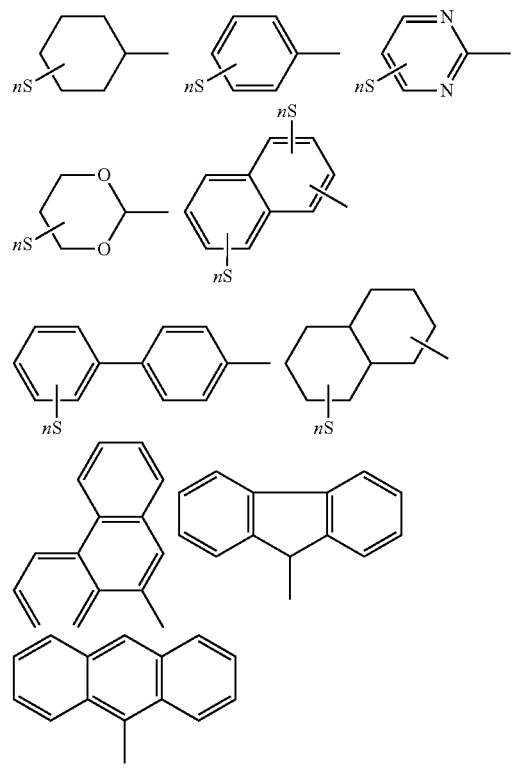

wherein n is 0 or 1 or an integer up to the number corresponding to the maximum number of possible substituents on the respective skeleton, and each substituent S independently from other substituents S is selected from among fluorine, chlorine, bromine, cyano, cyanomethyl, cyanoethyl, cyanoethenyl, dicyanoethenyl, bis(alkyloxycarbonyl)ethenyl, hydroxy, formyl, nitro and saturated or unsaturated, straight-chain or branched aliphatic groups.

10. A liquid crystal or liquid crystal mixture according to claim 1, wherein R$_1$-Y is a phenyl radical.

11. A liquid crystal or liquid crystal mixture according to claim 1, wherein the chiral amino alcohol has the following formula (3):

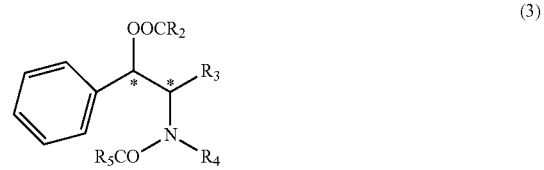

(3)

in which $R_2$ and $R_5$ designate the same or different cycloaliphatic, aromatic, heterocyclic or other substituents containing one or more of these structural elements, and which optionally are furnished with one or more radicals selected from among $C_1$-$C_{16}$-alkyl groups and in which $R_3$ and $R_4$ are the same or different substituents, which indicate hydrogen or branched or unbranched alkyl or alkyloxy groups or benzyl or phenethyl radicals.

12. A liquid crystal or liquid crystal mixture according to claim 2, wherein the radical $R_2$ contains exactly two structural elements of formula (1).

13. A liquid crystal or liquid crystal mixture according to claim 12, in which the chiral amino alcohol of formula (2) has mirror symmetry.

14. A liquid crystal or liquid crystal mixture according to claim 12, characterized in that $R_2$ has the meaning
$L_1$-$F_1$-$L_2$-$F_2$-$L_3$
wherein
$L_1$, $L_2$, $L_3$ are independently selected from the group consisting of a single covalent bond, straight chain or branched chain alkylene with 1-16 C atoms which is optionally substituted with OH, F, Cl, Br, CN or $NO_2$ and/or wherein individual $CH_2$ chain members can be replaced by O or S, and further consisting of —COO—, —CH═CH—, —CH═N—, —N═N—, —C≡C—, and
$F_1$ and $F_2$ are independently selected from the group consisting of a single bond and unsubstituted or substituted alicyclic, heterocyclic, and aromatic units.

15. An electro-optical system including a liquid crystal or liquid crystal mixture according to claim 1.

16. An electro-optical system according to claim 15, wherein two or a multiple of two liquid crystal mixtures are used in double-layered displays, wherein in each case two mixtures contain an enantiomer or diastereomer of an amino alcohol with a structural element of formula (1) according to claim 1, such that the two mixtures have the opposite senses of rotation.

17. Substituted, chiral amino alcohol, comprising one or more structural units of the following formula (1)

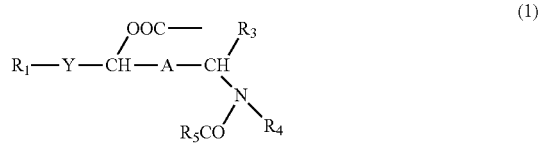
(1)

in which the abbreviations A, Y and $R_1$ and $R_3$ to $R_5$ have the following meanings:
A is a covalent bond or a saturated or unsaturated, straight-chain, branched or ring-containing hydrocarbon group,
Y is a covalent bond or a saturated or unsaturated, straight-chain, branched or ring-containing hydrocarbon group, which may have an oxygen atom on one of its ends, through which it is connected to $R_1$,
$R_1$ is a saturated or unsaturated, straight-chain or branched or ring-containing aliphatic radical or a heterocyclic or aromatic radical, which in all cases is substituted or unsubstituted and/or the carbon chain of which can be interrupted by one or more groups B,
$R_5$ is selected from the group consisting of
(a) araliphatic and cycloaliphatic unsubstituted or substituted radicals, the carbon chains of which may be interrupted by one or more groups B and/or by one or more groups D, (b) aromatic and heterocyclic groups substituted with one or more substituents selected from among cyano, cyanomethyl, cyanoethyl, cyanoethenyl, dicyanoethenyl, bis(alkyloxycarbonyl)ethenyl, hydroxy, formyl, nitro, unsaturated, straight-chain or branched aliphatic groups in which one or more C atoms may be replaced with oxygen atoms or carbonyl groups or substituted with halogen atoms and/or in which the aliphatic groups may be bound directly or over a coupling group, preferably selected from among O, NH, $NCH_3$, $SO_2$, CO, COO, OOC, CH═CH, C≡C, OCOO, CH═N, to the aromatic or heterocyclic radical, and saturated, straight-chain or branched aliphatic groups, in which C atoms are replaced by oxygen atoms or carbonyl groups or substituted with halogen atoms and/or in which the aliphatic group is bound to the aromatic or heterocyclic groups directly or through a coupling group selected from among O, NH, $NCH_3$, $SO_2$, CO, COO, OOC, CH═CH, C≡C, OCOO, CH═N,
$R_3$, $R_4$ each independently represent hydrogen or an unsubstituted or substituted, straight-chain or branched or ring-containing aliphatic substituent or an unsubstituted or substituted araliphatic substituent, the carbon chain of which may be interrupted by one or more groups B,
B is selected from among polymerizable or cross-linkable structural elements of the group comprising $C_1$-$C_{16}$-alkenyl, $C_1$-$C_{16}$-alkenyloxy, —C≡C—, —CH═CH—COO—, —CH═CH—, —CX═CH—COO— with X═$C_1$-$C_{16}$-alkyl and the trans-form of —OOC—CH═CH—COO—,
D is selected from —O—, —NH—, —N($CH_3$)—, —N($C_2H_5$)—, —$SO_2$—, —CO—, —COO—, —CH═CH—, —OCOO—, —$OCH_2$—, CH═N, —$CF_2CF_2$—.

18. Substituted, chiral amino alcohol according to claim 17, which has the formula (2):

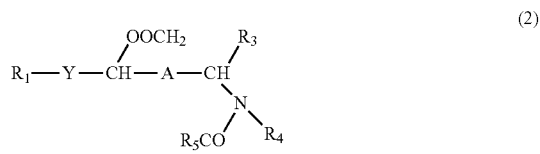
(2)

wherein the abbreviations A, Y, $R_1$ and $R_3$ to $R_5$ have the meanings as defined in claim 17 and $R_2$ is a monovalent or a divalent or polyvalent radical, selected from the group consisting of
(a) saturated and unsaturated, straight-chain and branched, substituted and unsubstituted aliphatic hydrocarbon radicals, wherein individual C atoms can be replaced by oxygen atoms or carbonyl groups, wherein the carbon chain of these radicals can optionally be interrupted by a group B as defined in formula (1) of claim 17, and
(b) araliphatic, cycloaliphatic, aromatic and heterocyclic, unsubstituted or substituted radicals, the carbon chain of which can be interrupted by one or more groups B and/or by one or more groups D as defined in formula (1) of claim 17,
(c) a single bond
wherein for the case in which $R_2$ is a divalent or polyvalent radical, this radical bears a second structural element or more than two structural elements of formula (1).

19. Substituted, chiral amino alcohol according to claim 18 with two structural elements of formula (1), characterized in that $R_2$ has the meaning $L_1$-$F_1$-$L_2$-$F_2$-$L_3$ wherein

- $L_1$, $L_2$, $L_3$ are independently selected from the group consisting of a single covalent bond, straight chain or branched chain alkylene with preferably 1-16 C atoms which is optionally substituted with OH, F, Cl, Br, CN or $NO_2$, and/or wherein individual $CH_2$ chian members can be replaced by O or S, and further consisting of —COO—, —CH═CH—, —CH═N, —N═N—, —C≡C—, and
- $F_1$ and $F_2$ are independently selected from the group consisting of a single bond and unsubstituted or substituted alicyclic, heterocyclic, and aromatic units.

20. Substituted chiral amino alcohol according to claim 19, wherein the unsubstituted or substituted alicyclic, heterocyclic and aromatic units are selected independently of one another from among 1,4-cyclohexylene, 2,5-pyrimidylene, 1.4-phenylene and 2,6-naphthylene, and/or these units are substituted with at least one substituent selected from among F, Cl, Br, CN. $NO_2$.

21. An electro-optical system according to claim 15, wherein the electro-optical system is a display, preferably a bistable display.

* * * * *